US011842134B2

(12) United States Patent
Maamari et al.

(10) Patent No.: US 11,842,134 B2
(45) Date of Patent: Dec. 12, 2023

(54) AUTOMATED DETERMINATON OF FAILURE MODE DISTRIBUTION

(71) Applicant: Synopsys, Inc., Mountain View, CA (US)

(72) Inventors: Fadi Maamari, Mountain View, CA (US); Shivakumar Shankar Chonnad, San Jose, CA (US); Abhishek Chauhan, New Delhi (IN); Jamileh Davoudi, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 297 days.

(21) Appl. No.: 17/482,334

(22) Filed: Sep. 22, 2021

(65) Prior Publication Data

US 2022/0100937 A1     Mar. 31, 2022

Related U.S. Application Data

(60) Provisional application No. 63/084,845, filed on Sep. 29, 2020.

(51) Int. Cl.
*G06F 30/333* (2020.01)
*G06F 30/327* (2020.01)
*G06F 30/31* (2020.01)
*G06N 7/01* (2023.01)

(52) U.S. Cl.
CPC ............ *G06F 30/333* (2020.01); *G06F 30/31* (2020.01); *G06F 30/327* (2020.01); *G06N 7/01* (2023.01)

(58) Field of Classification Search
CPC ...... G06F 30/333; G06F 30/31; G06F 30/327; G06F 2111/08; G06F 2119/02; G06F 30/3308; G06N 7/01; G01R 31/2894
See application file for complete search history.

(56) References Cited

U.S. PATENT DOCUMENTS

| 7,937,679 | B2 * | 5/2011 | Mariani ................. G06F 30/33 716/112 |
| 8,407,653 | B1 | 3/2013 | Schumacher et al. |
| 10,643,011 | B1 * | 5/2020 | Nardi ................. G06F 30/3323 |
| 10,853,545 | B1 * | 12/2020 | Nardi ..................... G06F 30/30 |
| 11,042,688 | B1 * | 6/2021 | Wu ........................ H10B 10/00 |
| 11,416,662 | B1 * | 8/2022 | Armato ............... G06F 30/3308 |

(Continued)

OTHER PUBLICATIONS

Asadi, et al. "An Analytical Approach for Soft Error Estimation in Digital Circuits" Dept of Elecrical Engineering, Northeastern University Boston, MA 02115 consists of 4 pages.

*Primary Examiner* — Nha T Nguyen
(74) *Attorney, Agent, or Firm* — Patterson + Sheridan, LLP

(57) ABSTRACT

A method includes tracing from an observation point in a circuit to an input of the circuit to produce a cone of influence that includes a plurality of components of the circuit. The plurality of components is connected at a plurality of nodes in the cone of influence and the plurality of components includes a plurality of logic elements. The method also includes, for each node of the plurality of nodes, determining an observability probability that a logical high or low value at a corresponding node propagates to the observation point. The method further includes determining a weighted soft error probability for each logic element of the plurality of logic elements and determining a weighed soft error failure mode distribution for the cone of influence.

20 Claims, 9 Drawing Sheets

(56) References Cited

U.S. PATENT DOCUMENTS

| | | | |
|---|---|---|---|
| 11,630,938 B1* | 4/2023 | Lorenzini | G06F 11/006 703/14 |
| 2019/0095298 A1* | 3/2019 | Fricano | G01R 31/2846 |
| 2022/0382943 A1* | 12/2022 | Chonnad | G06F 30/33 |

* cited by examiner

AUTOMATED DETERMINATON OF FAILURE MODE DISTRIBUTION

CROSS-REFERENCE TO RELATED APPLICATIONS

This application claims priority to and the benefit of U.S. Provisional Patent Application Ser. No. 63/084,845, entitled "Automated Determination of Failure Mode Distribution," filed Sep. 29, 2020, which is incorporated herein by reference in its entirety.

TECHNICAL FIELD

The present disclosure generally relates to an electronic design automation (EDA) system and more particularly, to a system and method for automatically determining a failure mode distribution for chip designs.

BACKGROUND

Integrated circuit (IC) chips used in automobiles are required to meet certain safety and quality standards. When the chips are designed, they undergo failure testing to determine whether the chips are safe to be used in automobiles. The failure tests calculate a series of metrics that indicate the safety of the chip (e.g., failure mode coverage (FMC), single point fault metric (SPFM), and latent fault metric (LFM)). These metrics may be used to calculate the automotive safety integrity level (ASIL) of the chip. One of the factors used to calculate this series of metrics is called a failure mode distribution (FMD), which is the weight assigned to a failure mode.

Typically, the FMD is determined through manual and qualitative engineering judgment (e.g., of a designer). For example, a designer may analyze a circuit design and determine circuit elements, fault points, observe points, and detection points. The designer may then determine the different failure modes for the design and calculate a FMD for these failure modes. These FMDs are then used to calculate other metrics like FMC, SPFM, and LFM.

The typical way of determining FMDs, however, is subjective and potentially incomplete, which results in inaccurate FMDs. Inaccurate FMDs can risk influencing the ASIL ratings of a product inaccurately. Additionally, when there is a qualitative engineering judgement, there is no traceable evidence of how the FMDs have been arrived. Thus, it becomes even more difficult to detect and correct an inaccurate FMD. The inaccurate FMDs may result in unsafe chips being installed in automobiles. These unsafe chips may fail, leading to dangerous automobile crashes.

SUMMARY

According to an embodiment, a method for determining a weighed soft error failure mode distribution includes tracing from an observation point in a circuit to an input of the circuit to produce a cone of influence that includes a plurality of components of the circuit. The plurality of components is connected at a plurality of nodes in the cone of influence, and the plurality of components includes a plurality of logic elements. The method also includes, for each node of the plurality of nodes, determining, based on a functional mode setup of the circuit, an observability probability that a logical high or low value at a corresponding node propagates to the observation point. The method further includes determining a weighted soft error probability for each logic element of the plurality of logic elements based on an area of a corresponding logic element and the observability probability of an output node of the corresponding logic element and determining a weighed soft error failure mode distribution for the cone of influence based on a sum of the weighted soft error probabilities for each logic element of the plurality of logic elements.

The method may also include determining, for each node of the plurality of nodes, a second observability probability that an error at a corresponding node propagates to a safety mechanism that handles the error.

The soft error failure mode distribution may be a ratio of the sum of the weighted soft error probabilities for each logic element of the plurality of logic elements to a sum of the weighted soft error probabilities for each logic element across a plurality of cones of influence.

The method may further include generating a list of fault locations that includes nodes of the plurality of nodes that have a non-zero observability probability per failure mode.

Determining the observability probability for a node may be based on a control probability and logic type encountered on the path to that node.

The method may also include determining an automotive safety integrity level based on the soft error failure mode distribution.

The observation point may be specified in a received design file for the circuit.

According to another embodiment, an apparatus for determining a weighed soft error failure mode distribution, the apparatus includes a memory and a hardware processor communicatively coupled to the memory. The hardware processor traces from an observation point in a circuit to an input of the circuit to produce a cone of influence that includes a plurality of components of the circuit. The plurality of components is connected at a plurality of nodes in the cone of influence. The plurality of components includes a plurality of logic elements. The hardware processor also, for each node of the plurality of nodes, determines, based on a functional mode setup of the circuit, an observability probability that a logical high or low value at a corresponding node propagates to the observation point and determines a weighted soft error probability for each logic element of the plurality of logic elements based on an area of a corresponding logic element and the observability probability of an output node of the corresponding logic element. The hardware processor further determines a weighed soft error failure mode distribution for the cone of influence based on a sum of the weighted soft error probabilities for each logic element of the plurality of logic elements.

The hardware processor may also determine, for each node of the plurality of nodes, a second observability probability that an error at a corresponding node propagates to a safety mechanism that handles the error.

The soft error failure mode distribution may be a ratio of the sum of the weighted soft error probabilities for each logic element of the plurality of logic elements to a sum of the weighted soft error probabilities for each logic element across a plurality of cones of influence.

The hardware processor may also generate a list of fault locations that includes nodes of the plurality of nodes that have a non-zero observability probability per failure mode.

Determining the observability probability for a node may be based on a control probability and logic type encountered on the path to that node.

The hardware processor may also determine an automotive safety integrity level based on the soft error failure mode distribution.

The observation point may be specified in a received design file for the circuit.

According to another embodiment, a method for determining a permanent error failure mode distribution includes tracing from an observation point in a circuit to an input of the circuit to produce a cone of influence that includes a plurality of components of the circuit. The plurality of components is connected at a plurality of nodes in the cone of influence, and the plurality of components includes a plurality of gates. The method also includes, for each node of the plurality of nodes, determining, based on a functional mode setup of the circuit, an observability probability that a logical high or low value at that node propagates to the observation point. The method further includes determining a set of gates of the plurality of gates that have an output node of the plurality of nodes with a non-zero observability probability based on one or more of the observability probabilities of the plurality of nodes and determining a permanent error failure mode distribution for the cone of influence based on an area of the set of gates or a number of gates in the set of gates.

The method may also include determining, for each node of the plurality of nodes, a second observability probability that an error at that node propagates to a safety mechanism that handles the error.

The permanent error failure mode distribution may be a ratio of the area of the set of gates to a total area of gates that have an output node with a non-zero observability probability across a plurality of cones of influence per failure mode.

The method may also include generating a list of fault locations that includes nodes of the plurality of nodes that have a non-zero observability probability.

Determining the observability probability for a node may be based on a control probability and logic type encountered on the path to that node.

The method may also include determining an automotive safety integrity level based on the permanent error failure mode distribution.

BRIEF DESCRIPTION OF THE DRAWINGS

The disclosure will be understood more fully from the detailed description given below and from the accompanying figures of examples described herein. The figures are used to provide knowledge and understanding of examples described herein and do not limit the scope of the disclosure to these specific examples. Furthermore, the figures are not necessarily drawn to scale.

DETAILED DESCRIPTION

This disclosure describes a system that automatically analyzes a circuit design (e.g., a chip design) and calculates one or more FMDs for the design. These FMDs are then used to calculate a series of safety metrics for the design. Generally, the system traces through the paths in a design to determine one or more cones of influence. The system then automatically calculates various probabilities (e.g., control probabilities, observability probabilities) for permanent errors and soft errors. The system determines the FMDs for the permanent errors and soft errors based on these calculated probabilities. As a result, the system does not rely on subjective judgment to determine the FMDs for permanent and soft errors, which improves the reliability and safety of chips, in certain embodiments.

Figure 1:
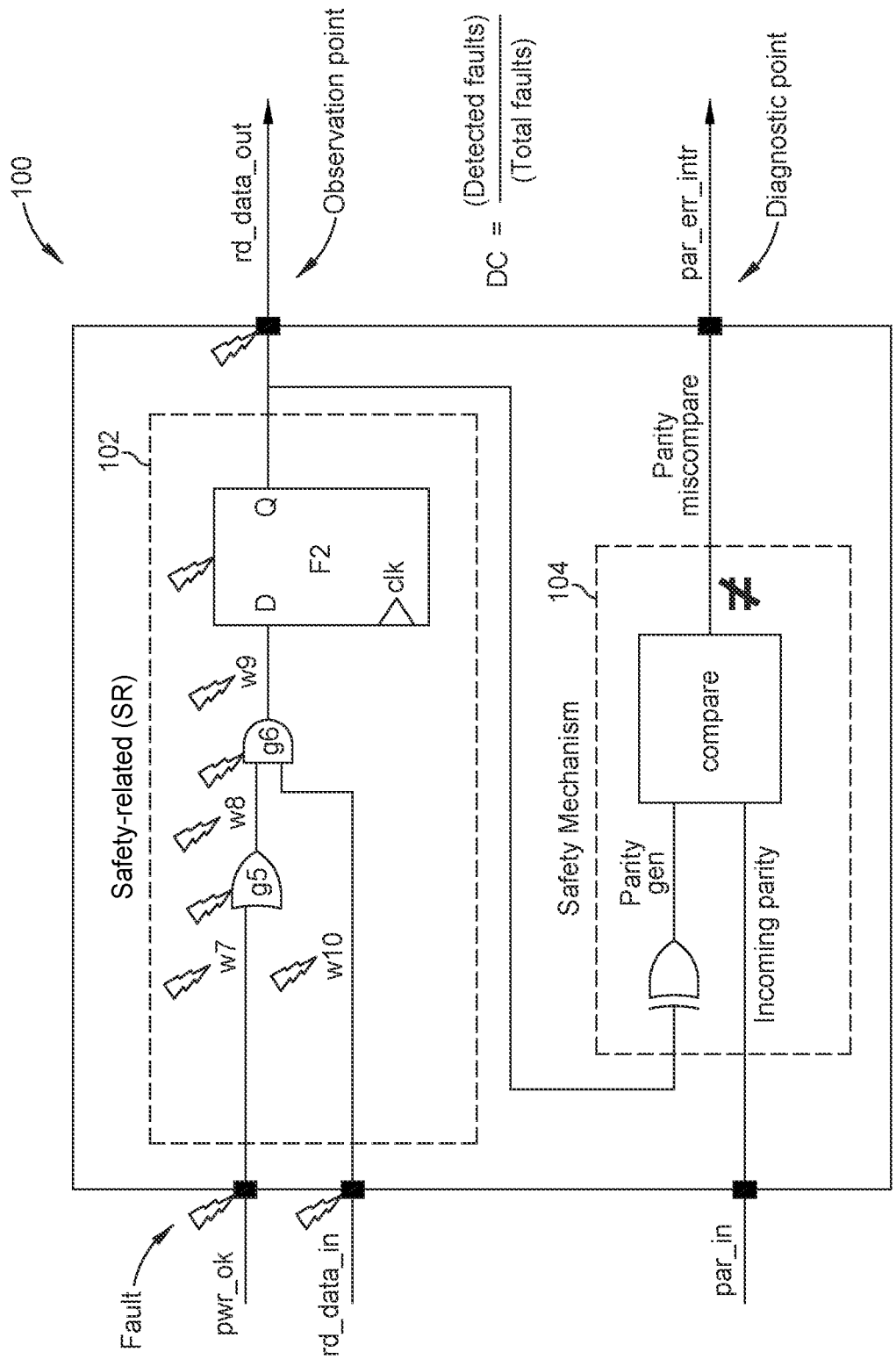
FIG. 1 illustrates an example circuit design and analysis, according to an example embodiment of the present disclosure.

FIG. 1 illustrates an example circuit design 100 and analysis. As seen in FIG. 1, the circuit design 100 includes a circuit 102 and a safety mechanism 104. Generally, the safety mechanism 104 attempts to catch errors in the output of the circuit 102 (e.g., by comparing parity bits) that indicate that there is a fault within the circuit 102. The errors or faults cause the safety mechanism 104 to trigger certain remedial actions to handle the fault (e.g., rerouting signals through backup circuits, shutting down faulty circuits, etc.).

In an example operation, the system (e.g., the computer system 600 shown in FIG. 6) may be provided with a design file that indicates one or more observation points in the design. These observation points may have been specified by a user, such as a designer of the circuit. In the example of FIG. 1, the design 100 includes an observation point at the output (rd_data_out) of the circuit 102. The system determines a cone of logic (also referred to as cone of influence (COI) herein) by back tracing a path from the observation points to the inputs (e.g., pwr_ok and rd_data_in), to identify or determine components in the path, such as logic elements (e.g., NAND gates, NOR gates, XOR gates, and flip-flops), ports, and hierarchies. The areas of components in the path can be summed to arrive at the area of the path. The area of a component may refer to the physical size of the component, the size of a physical area occupied by the component, and/or a number of transistors or gates in the component. The failure mode distribution indicates the relative distribution of the areas of the paths in the design. The system can also identify the fault list for the path, which can be used in a fault simulation campaign to yield the right diagnostic coverage. The list can help in identifying fault locations (e.g., indicated by lightning bolt symbols in the example of FIG. 1) where faults are more likely to reach observe points. The fault locations may be locations in the design 100 where a fault or error (e.g., flipped bit, short circuit, or physical break in the circuit path) may occur. Faults or errors occurring at different fault locations may have different probabilities of reaching an observe point. For example, a flipped bit at an input of a flip-flop may likely correct itself before the flip-flop stores the bit. On the other hand, a short circuit or broken circuit within a main path of the design 100 will likely reach an observe point and impact the output. During fault simulation or a fault injection campaign, simulated faults are injected at fault locations identified in the list, because faults injected at these fault locations are more likely to reach the observe points and, as a result, the effects that these faults have on the design and how the design handles these faults may be observed. In the example of FIG. 1, faults may be injected at the locations w7, w8, w9, and w10 in the circuit 102. If the safety mechanism 104 is involved, the probability that a fault location can be detected at the diagnostic point (e.g., at the output of the safety mechanism 104) can also be calculated accurately. The safety mechanism 104 may be provided by a user or may be identified by the system from a library of known safety mechanisms.

In certain embodiments, because the system automatically calculates the FMDs based on calculated probabilities rather than manual, subjective engineering judgment, both the accuracy of the FMDs and the speed at which they are calculated are improved. As a result, the safety and reliability of the circuit 102 is improved. Additionally, the system provides an accurate and complete list of fault locations for a design that can be used in arriving at the diagnostic coverage (DC).

In some embodiments, starting from a user interface, a user specifies the observation points pertinent to each failure mode and allows the present system to determine the failure mode distribution. The fault locations that influence an observation point are also determined from the cells or components in the path for a cone of influence. When the safety mechanism 104 is involved, the probability that the fault location can be detected by the safety mechanism 104 can also be determined. In a manual approach, this would be time consuming and inaccurate. Because the exact cells or components have been accounted for in each failure mode cone, the failure mode distribution based on their structural analysis is accurate as per actuals with real data with no assumptions or instinctive judgements. Because the present system can approach this automatically with no manual calculations involved, it is devoid of any inadvertent human errors. The present system does not require a user's expert judgement, hence is realistic and not subjective. The report of analysis can yield a quantitative result rather than qualitative expert judgement. The report will act as a traceable evidence of FMD data that another user or system (e.g., a safety assessor or safety assessment system) will need during safety related assessment and reviews.

In some embodiments, to calculate DC, an accurate fault location list is needed. The system can help arrive at an accurate fault location list for each failure mode. The system also helps in identifying hotspots (e.g., faults that are more likely to reach an observe point). In case of soft errors, computed error propagation probabilities help in differentiating between logic elements (e.g., flops) that are more likely to contribute to failure of observe point outputs. This flow can work in both register-transfer levels (RTL) and netlist levels of representation. An advantage of working at RTL is that any issues can be identified early in the design cycle. The system takes into account functional mode setup of the design. Functional mode constants are propagated and considered during probability computation.

In certain embodiments, the present system saves designers time and effort in arriving at FMDs, fault location lists, and the probability of a fault being detected by a safety mechanism, due to the fast turnaround time when the system does the analysis. Additionally, due to a tool-based structural evaluation, in which the system converts design code into logic and then evaluates the logic instead of scripts, the accuracy is high. The present system can produce a report of FMD as a source of data for the inputs into a failure modes, effects, and diagnostic analysis (FMEDA), which is a deliverable in any safety related analysis. The user interface displays the block name and its observation points. The system traverses the logic path all the way back to the inputs of the element/module fanning beyond logic elements (e.g., gates and flops), ports, and sub-hierarchies and calculates observability probabilities while taking into account the functional mode setup of the design. The calculations are also applied for the logic overlapping across logic cones. The system ensures that the relative distribution amongst all failure modes add up to 100%, which is expected in an FMEDA. When the logic elements in the cone are considered, it can be used to precisely evaluate the percentage of the soft error's contribution per failure mode cone (e.g., as the soft errors in safety analysis are done only on registered elements like flops in certain embodiments). During the soft error analysis, computed error propagation probabilities help in differentiating between logic elements that are more likely to contribute to failure of observe point outputs.

For calculating FMD, the design files (RTL or netlist) along with failure modes specification are passed to a system. The failure modes specification includes blocks under consideration along with the failure mode identifier and its observation points (e.g., outputs where a failure is observable). The system then traverses from the observation point back to the block's inputs to carve out a failure mode cone of influence (COI). Depending upon the type of error (e.g., permanent or soft error), the probability of the contribution from a gate that can reach an observe point is calculated for design nodes. For permanent errors, based on user's input, either exact probability can be used or binary weight assigning probability of one anytime probability is non-zero to reflect that permanent error has a very long time opportunity to propagate. For soft errors, the probability is used to calculate their contribution to failure mode distribution. Based on the COI, the cells within the cone can be identified, and their pins can form fault locations list along with the ports of hierarchies traversed. Any fault location can be specified to know the probability of its detection at the diagnostic point.

Figure 2A:
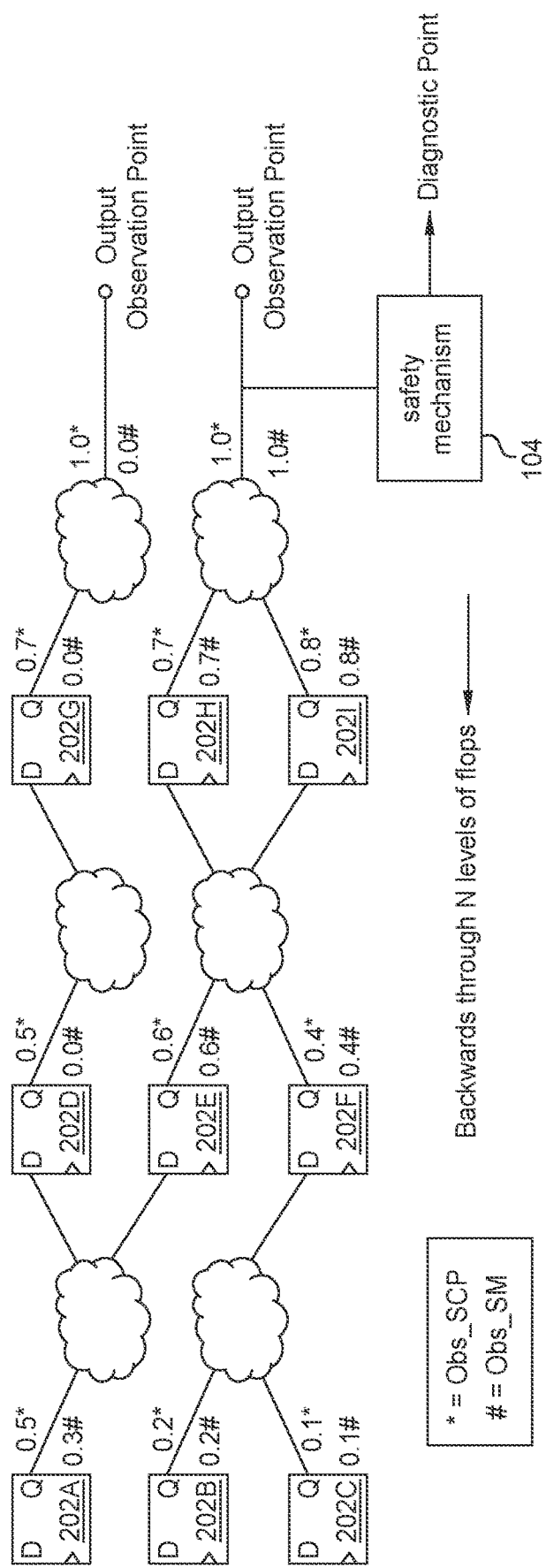
FIG. 2A illustrates an example back tracing of logic, according to an example embodiment of the present disclosure.

FIG. 2A illustrates an example back tracing of logic to determine observability probabilities and the COI. As seen in FIG. 2A, various probabilities can be calculated tracing back from the observation points. An initial control probability is calculated for each node of the design. A node may be considered an element of the circuit (e.g., gate, flop) or a point at which one or more elements of the circuit connect. In the example of FIG. 2A, the nodes include flip flops 202A through 202I. An initial control probability is computed or set for the inputs of the design. The initial control probability for an input may be the probability that the input experiences or has a particular logic value (e.g., 0 or 1). For example, the control probabilities for primary input ports may be initialized to 0.5 to indicate that the primary input ports have an equal likelihood of experiencing or having a logic 0 or logic 1 value. These initial probabilities can be set to any desired or predetermined value (e.g., a user-defined value) that can also be seeded for any constants that were specified in the functional mode setup. Multi time frame analysis is performed where the initial control probabilities are propagated through both combinational and sequential logic to the outputs to compute control probabilities for the nodes in the circuit (e.g., the probability that the nodes experience or have a value of 0 or 1). This analysis may be common to all the failure modes, and computed control probabilities are used for observability probability calculation.

After setting or determining the initial control probabilities of the nodes, the system determines observability probabilities for the nodes. An observability probability represents the probability that a logical value at a node propagates to the observation point. The observability probability represents the probability that an error at the node becomes observable because the error propagated to the observation point. Two types of observability probabilities may be computed:

obs_scp: Observability with respect to safety critical points/observe points. obs_scp of a node represents the probability that a value from that node can reach a safety critical point/observe point. The obs_scp for an observation point or safety critical point may be initialized to 1; and obs_sm: Observability with respect to safety mechanism. obs_sm of a node represents the probability that an error which is present at the node will be handled by a safety mechanism. The obs_sm for an observation point or safety critical point may be initialized to 1 if the observation point or safety critical point is coupled to a safety mechanism.

After initialization, the probabilities (e.g., obs_scp and obs_sm) are propagated in fan-in cone (e.g., tracing back from observation points) using the control probabilities computed earlier. Multi time frame analysis is used here also where probabilities are propagated through both combinational and sequential logic traversing through sub-hierarchies if any.

In the example of FIG. 2A, the flip flop 202A has an obs_scp of 0.5 and an obs_sm of 0.3. The flip flop 202B has an obs_scp of 0.2 and an obs_sm of 0.2. The flip flop 202C has an obs_scp of 0.1 and an obs_sm of 0.1. The flip flop 202D has an obs_scp of 0.5 and an obs_sm of 0.0. The flip flop 202E has an obs_scp of 0.6 and an obs_sm of 0.6. The flip flop 202F has an obs_scp of 0.4 and an obs_sm of 0.4. The flip flop 202G has an obs_scp of 0.7 and an obs_sm of 0.0. The flip flop 202H has an obs_scp of 0.7 and an obs_sm of 0.7. The flip flop 202I has an obs_scp of 0.8 and an obs_sm of 0.8. Both observation points have an obs_scp of 1.0. The observation point that is connected to the safety mechanism 104 has an obs_sm of 1.0.

Figure 2B:
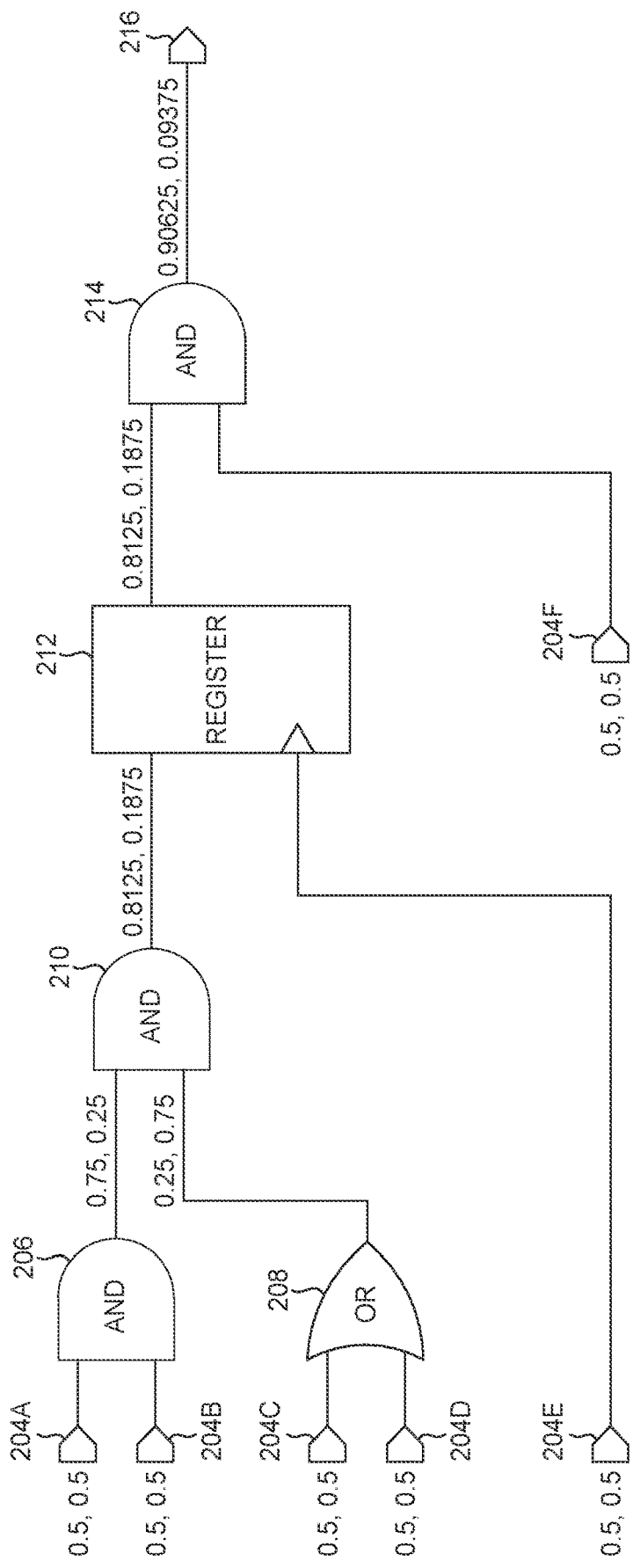
FIG. 2B illustrates an example of determining control probabilities, according to an example embodiment of the present disclosure.

FIG. 2B illustrates an example of determining control probabilities, according to an example embodiment of the present disclosure. The control probabilities of inputs 204 are initialized to 0.5, indicating that the inputs 204 are equally as likely to be 0 or 1 (hence control to 0 is 0.5 and control to 1 is 0.5). The control probabilities for outputs of flip flops (e.g., flip flops in the register 212) are also initialized to 0.5, but these initial control probabilities will be updated during control probability calculation. As seen in FIG. 2B, each input has two corresponding probabilities. The first probability is the control to 0 probability and the second probability is the control to 1 probability.

After initialization, control probabilities are calculated for the nodes in the design by traversing from the inputs 204 to the output 216. For each gate, the control probability is computed using the control probabilities of its inputs and the functionality of the gate. These probabilities are computed and propagated both for combinatorial and sequential logic. In the example of FIG. 2B, the control probabilities for the output of the AND gate 206 are 0.75 and 0.25, indicating that the AND gate 206 has a ¾ chance of outputting a 0 and a ¼ chance of outputting a 1 if the inputs 204A and 204B of the AND gate 206 are equally as likely to be 0 or 1. The control probabilities for the output of the OR gate 208 are 0.25 and 0.75, indicating that the OR gate 208 has a ¼ chance of outputting a 0 and a ¾ chance of outputting a 1 if the inputs 204C and 204D of the OR gate 206 are equally as likely to be 0 or 1.

The control probabilities for the output of the AND gate 210 are calculated based on the control probabilities for the outputs of the AND gate 206 and the OR gate 208. Notably, the likelihood that the AND gate 210 outputs a 1 is the probability that the output of the AND gate 206 is 1 (0.25) and the output of the OR gate 208 is 1 (0.75). The probability that the output of the AND gate 210 is 1 is 0.1875, the product of 0.25 and 0.75. Conversely, the probability that the output of the AND gate 210 is 0 (i.e., the probability that the output of the AND gate 206 is 0 or the output of the OR gate 208 is 0) is 0.8125, which is (i) the probability that the output of the AND gate 206 is 0+(ii) the probability that the output of the OR gate 208 is 0−(iii) the probability that both the outputs of the AND gate 206 and the OR gate 208 are 0.

The control probabilities for the output of the register 212 is the same as the control probabilities for the output of the AND gate 210.

The control probabilities for output of the AND gate 214 are calculated based on the control probabilities for the output of the register 212 and the control probabilities for the input 204F. The probability that the output of the AND gate 214 is 1 is the probability that the output of the register 212 is 1 (0.1875) and the input 204F is 1 (0.5), which is 0.09375. Conversely, the probability that the output of the AND gate 214 is 0 is the probability that the output of the register is 0 (0.8125) or the input 204F is 0 (0.5), which is 0.90625. As a result, the control probabilities for the output 216 are 0.90625 and 0.09375.

Figure 2C:
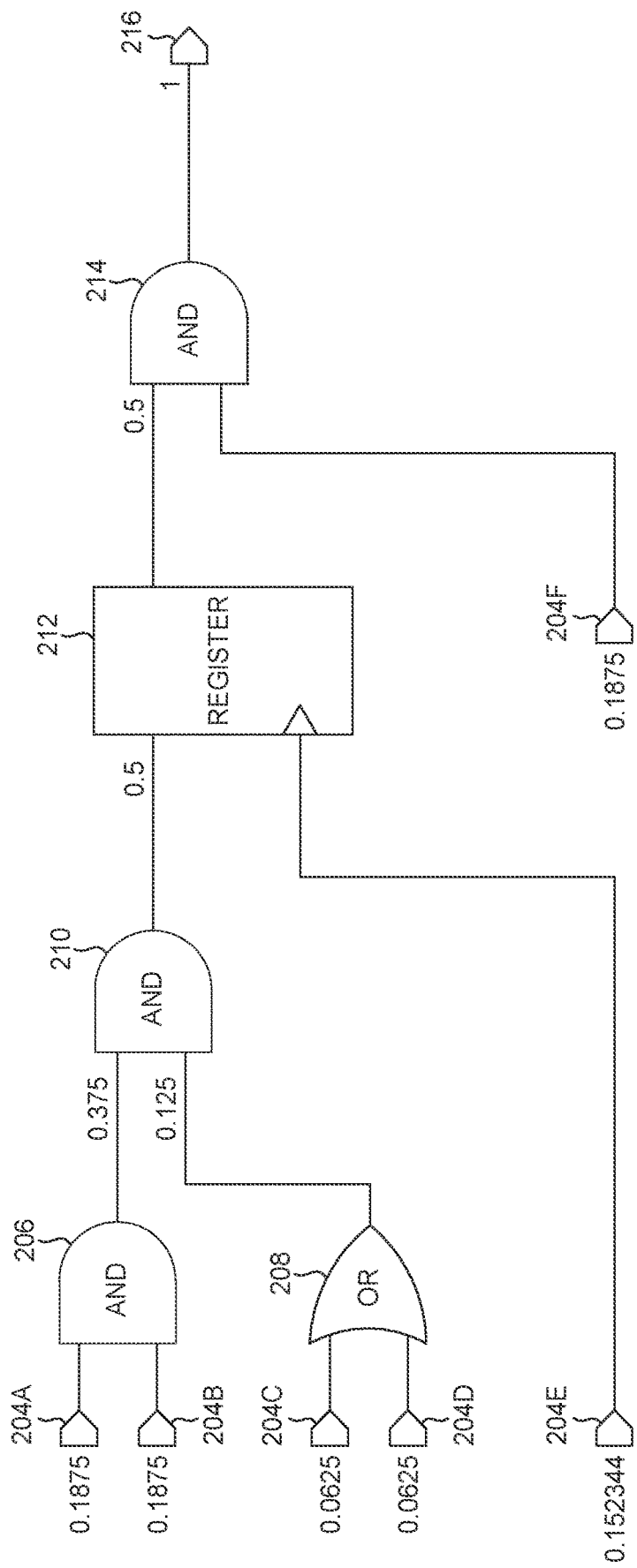
FIG. 2C illustrates an example of determining observability probabilities, according to an example embodiment of the present disclosure.

FIG. 2C illustrates an example of determining observability probabilities, according to an example embodiment of the present disclosure. Observability probabilities are calculated after control probabilities are calculated. The observability probability of an observability point is initialized to 1. In the example of FIG. 2C, the observability probability of the output 216 is initialized to 1. The observability probabilities are then propagated in the fan-in cone of the output 216 using the calculated control probabilities. For each gate, the observability probability of an input is calculated using the observability probability of its output, the control probabilities of the input, and the functionality of the gate. These probabilities are calculated and propagated for combinatorial and sequential logic.

In the Example of FIG. 2C, the observability probability for the upper input of the AND gate 214 is 0.5, which is the control probability that the lower input (input 204F) is 1. The observability probability for the input 204F is 0.1875, which is the control probability that the upper input of the AND gate 214 is 1. The observability probability of the input of the register 212 is the same as the observability probability at its output.

The observability probability of the upper input of the AND gate 210 is 0.375, which is the observability probability of the output of the AND gate 210 (0.5) multiplied by the control probability that the lower input of the AND gate 210 is 1 (0.75). The observability probability of the lower input of the AND gate 210 is 0.125, which is the observability probability of the output of the AND gate 210 (0.5) multiplied by the control probability that the upper input of the AND gate 210 is 1 (0.25). A similar process is followed to determine the observability probabilities for the inputs 204A (0.1875), 204B (0.1875), 204C (0.0625), and 204D (0.0625).

As discussed above, back tracing the logic produces a COI. For carving the COI, only the logic inside the block targeted for failure mode is considered. COI is computed for each failure mode for both permanent and soft errors. Observability probabilities computed from earlier analysis are used to determine whether an internal node impacts the observe point or not. For example, the obs_scp of a node indicates the probability that a value at the node will propagate to an observation point and be observed. Stated differently, the obs_scp indicates the probability that an error at the node will propagate to an observation point and affect the value at the observation point. The cone itself is derived by backtracking the logic from the observation point all the way to the primary inputs of the module.

The FMD for permanent errors and soft errors is then determined. To determine the FMD for permanent errors, the system first determines a number of gates in each cone of influence with an output node with a non-zero obs_scp. COI for a failure mode is the total area of these gates. The permanent error FMD for a failure mode is then calculated as the ratio of the area of gates with output nodes with a non-zero obs_scp to the total area of gates across all failure modes COIs for that block. If the area is not known, then gate count is used as a substitute. Stated differently, the permanent error FMD is computed by relative comparison of the areas of each failure mode amongst each other. For example, if COI_1, COI_2, . . . , COI_n are COI values for failure modes FM_1, FM_2, . . . FM_n specified for the same block, then the permanent error FMD values for FM_1, FM_2, . . . FM_n will be COI_1/(COI_1+COI_2+ . . . + COI_n); COI_2/(COI_1+COI_2+ . . . +COI_n), . . . COI_n/(COI_1+COI_2+ . . . +COI_n).

To determine the FMD for soft errors, the system determines an area of logic elements (e.g., each flop) in a COI. The area may correspond to a number of transistors or electric components (e.g., flip-flops) in the logic element or to the physical sizes of the electric components in the logic element. The system then multiplies the area of each logic element by the obs_scp of an output node of that logic element to produce a weighted soft error probability for that logic element. The soft error probability for a logic element may represent the probability that a soft error in that logic element reaches the observation point. The system then sums the weighted soft error probabilities of all logic elements (e.g., all flops) in a cone to compute the COI. The soft error FMD for a failure mode is then calculated as the ratio of the sum of the weighted soft error probabilities of the logic elements (e.g., all flops) in the cone (i.e. COI of failure mode) to the total sum of the weighted soft error probabilities of the logic elements in all failure modes for that block. Using the terminology of the previous example, the soft error FMD values for FM_1, FM_2, . . . , FM_n will be COI_1/(COI_1+COI_2+ . . . +COI_n); COI_2/(COI_1+COI_2+ . . . +COI_n); COI_n/(COI_1+COI_2+ . . . + COI_n).

In certain embodiments, using this approach, the logic path is traversed from the observation points back to the inputs of the element/module fanning beyond flops, ports, and sub-hierarchies and it works seamlessly even with logic overlapping across logic cones. Additionally, the FMDs are based on structural analysis, which calculates actual areas of actual cells in a cone, and no manual approach is involved. Quantitative analysis is done with real data, not qualitative analysis through expert judgement. The present approach takes into account functional mode setup (e.g., logic resolved through constant propagation). For soft errors, the computed error propagation probabilities help in differentiating between logic elements (e.g., flops) that are more likely to contribute to failure of observe point outputs.

In some embodiments, the system evaluates an attribute for the safety mechanism 104 to determine the accuracy or efficiency of the safety mechanism 104. For example, the system may evaluate how effective the safety mechanism 104 is at detecting and/or handling faults. The system may consider the efficiency of the safety mechanism 104 in determining the FMDs of the circuit design.

Figure 3:
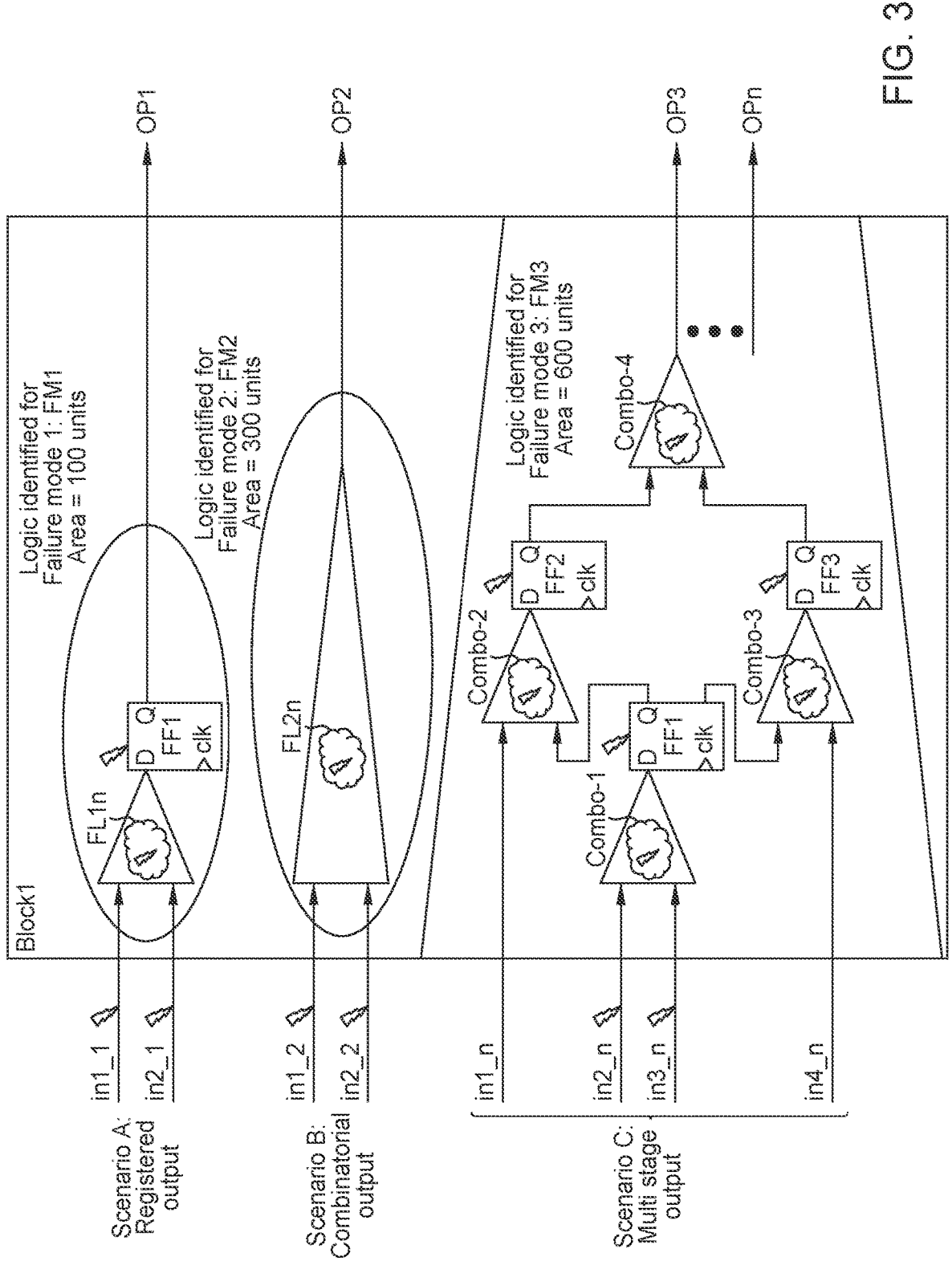
FIG. 3 illustrates example cones of influence in a chip design, according to an example embodiment of the present disclosure.

FIG. 3 illustrates example COI in a chip design. The COI for Scenario A is represented by an oval encompassing FL1$n$ and FF1. The COI for Scenario B is represented by the oval encompassing FL2$n$. The COI for Scenario C is represented by the trapezoid encompassing Combo-1, Combo-2, Combo-3, Combo-4, FF1, FF2, and FF3. As seen in FIG. 3, Block 1 of a design has three failure modes (FM1, FM2, and FM3) with at least three different observation points (OP1, OP2, and OP3). Block 1 may have any suitable number of failure modes with any suitable number of observation points (OPn). The area distributions of these failure modes may be:

Area FM1=100 units;
Area FM2=300 units; and
Area FM3=600 units.

These areas may be derived based on summations of all cell areas within the logic cone. The FMDs of these cones may be calculated as:

Failure mode distribution of FM1=100/(100+300+600)= 10%;
Failure mode distribution of FM2=300/(100+300+600)= 30%; and
Failure mode distribution of FM3=600/(100+300+600)= 60%.

Figure 4:
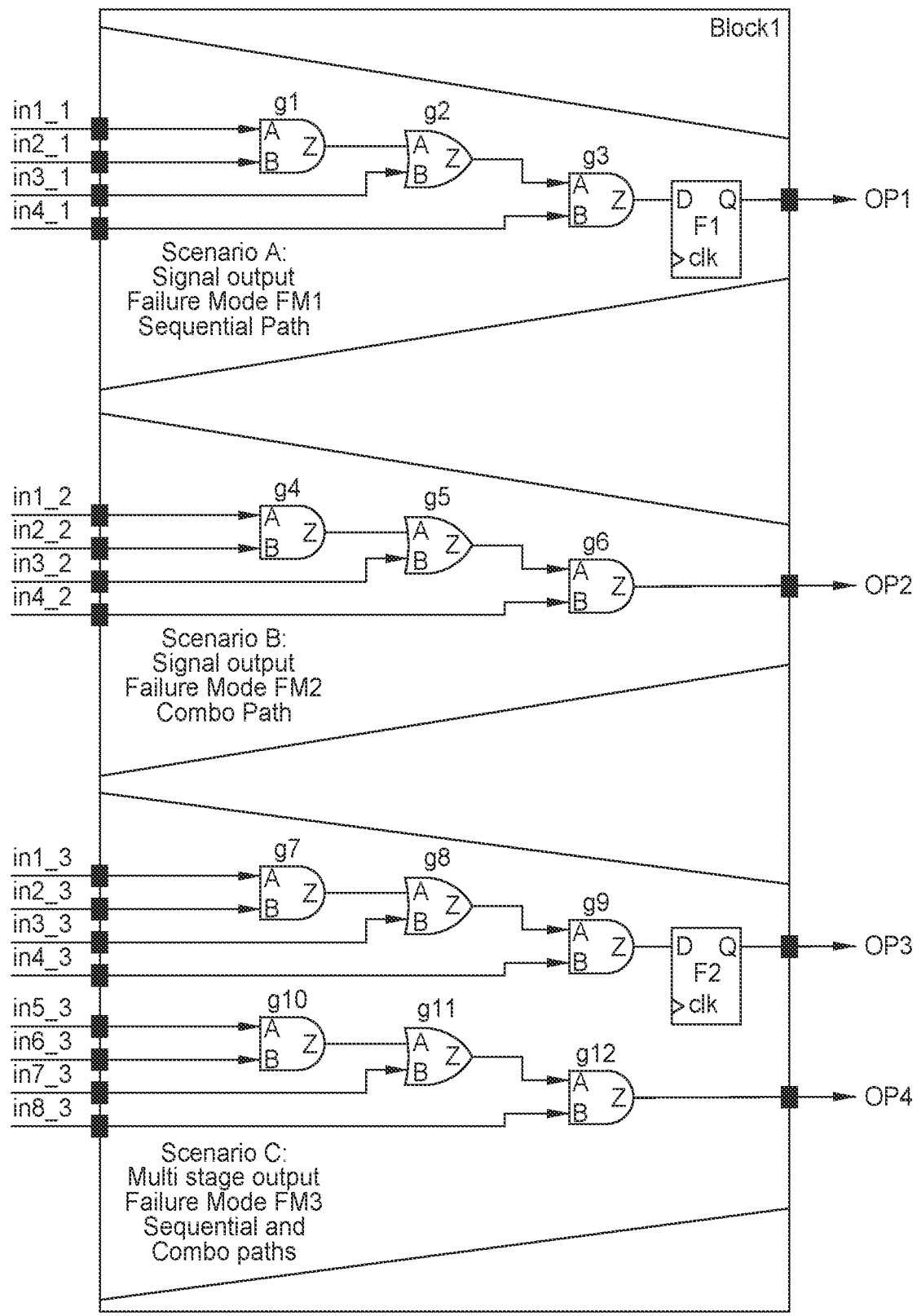
FIG. 4 illustrates example cells within cones of influence, according to an example embodiment of the present disclosure.

FIG. 4 illustrates example cells within COI. The COI for Scenario A is represented by the trapezoid encompassing g1, g2, g3, and F1. The COI for Scenario B is represented by the trapezoid encompassing g4, g5, and g6. The COI for Scenario C is represented by the trapezoid encompassing g7, g8, g9, g10, g11, g12, and F2. As discussed previously, the system provides a fault location list for each cone. Using the example of FIG. 4, because the failure mode cones are carved out, a designer can identify the respective nodes on which a fault injection campaign can be exercised. The fault locations for each failure mode can be derived as shown below.

Fault locations in cone of failure mode FM1=In1_1, In2_1, In3_1, In4_1, g1.A, g1.B, g1.Z, g2.A, g2.B, g2.Z, g3.A, g3.B, g3.Z, F1.D, F1.Q, OP1;

Fault locations in cone of failure mode FM2=In1_2, In2_2, In3_2, In4_2, g4.A, g4.B, g4.Z, g5.A, g5.B, g5.Z, g6.A, g6.B, g6.Z, OP2; and Fault locations in cone of failure mode FM3=In1_3, In2_3, In3_3, In4_3, In5_3, In6_3, In7_3, In8_3, g7.A, g7.B, g7.Z, g8.A, g8.B, g8.Z, g9.A, g9.B, g9.Z, g10.A, g10.B, g10.Z, g11.A, g11.B, g11.Z, g12.A, g12.B, g12.Z, OP3, OP4, F2.D, F2.Q.

In certain embodiments, these precise derivations of the fault locations may be further pruned to avoid any duplications using fault collapsing. All these determinations without the need of manual intervention can yield accurate results of the diagnostic coverage when subjected to fault injection campaign. The system also provides the probabilities of errors reaching observation points for all fault locations.

These probabilities can be used to find hotspots, areas that are more likely to cause failure.

In some embodiments, the system carves out of the COI for each failure mode based on user specified observation points. Additionally, the system infers the cells in a COI to get the area of the cone and the fault locations within the cone. Furthermore, the system calculates the probability of a fault propagation towards a user specified diagnostic point (obs_sm) and observe point (obs_scp). Moreover, the system performs each of these calculations quickly and with increased accuracy.

Figure 5:
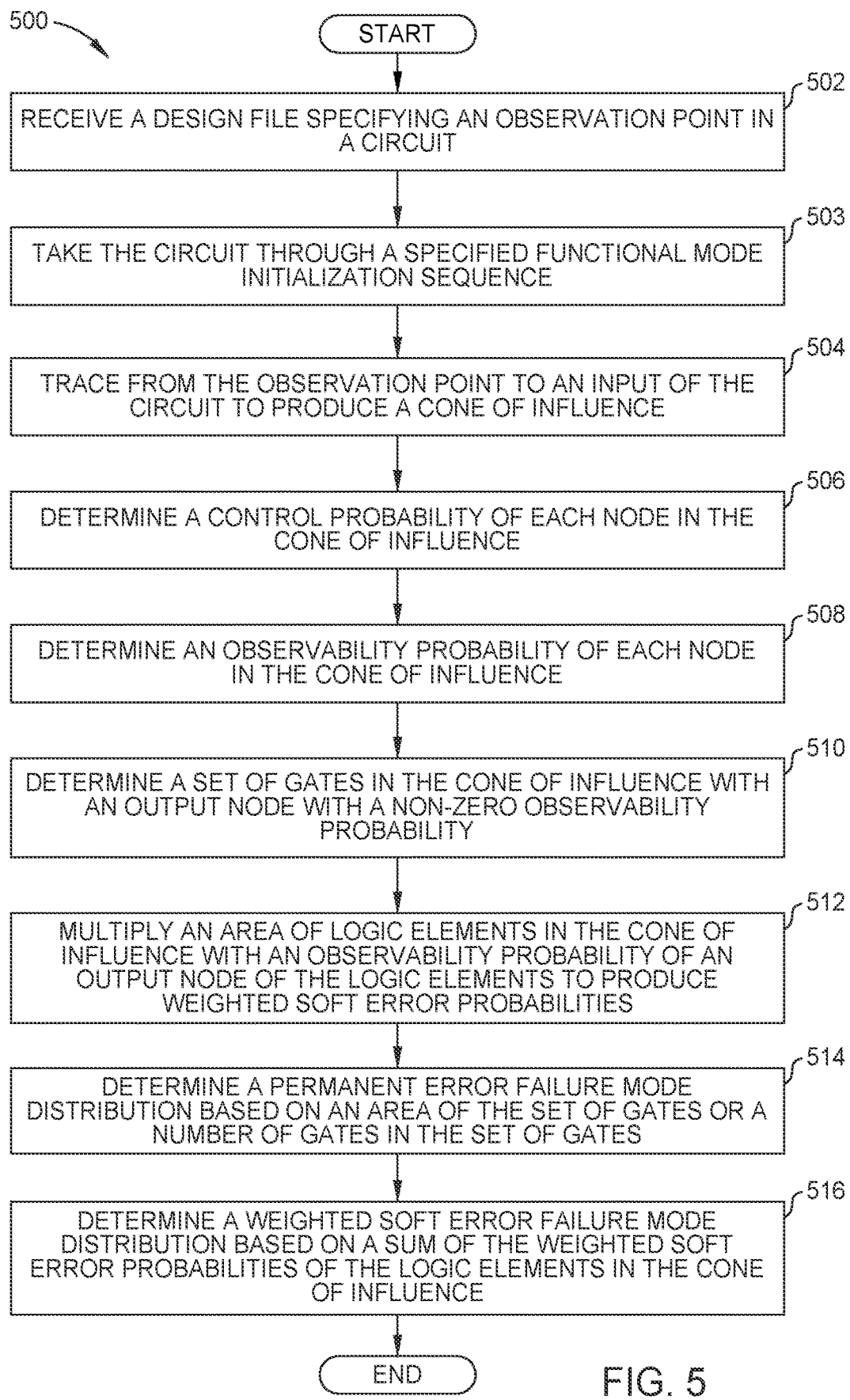
FIG. 5 is a flowchart of a process for determining permanent error and soft error failure mode distributions.

FIG. 5 is a flowchart of a process 500 for determining permanent error and soft error FMDs. Generally, the contemplated system (e.g., the computer system 600 in FIG. 6) performs the steps of process 500. In particular embodiments, by performing process 500, FMDs are determined quicker and more accurately than in typical systems.

The system receives a design file specifying an observation point in a circuit (e.g., the circuit design 100 in FIG. 1) in 502. The design file can specify any number of observation points for the circuit. Each observation point may correspond to a particular failure mode for the circuit. The circuit includes one or more components (e.g., gates and flops). These components are connected at one or more nodes in the circuit. The system takes the circuit through a specified functional mode initialization sequence in 503 so that the circuit is in a functional mode or a functional mode setup rather than a test mode.

The system traces from the observation point to an input of the circuit to produce a cone of influence in 504. If multiple observation points are specified for the circuit, then multiple cones of influence are determined for the circuit. In 506, the system determines a control probability for each node in the cone of influence. The control probability indicates the probability that the value at a node is a logical low value (0) or a logical high value (1). For example, there may be a 50% chance that the value at an input of a 2-input AND gate is a 0 or a 1 and there may be a 25% chance that the value at an output of that AND gate is a 1. Based on these control probabilities, the system determines an observability probability for each node in the cone of influence in 508. The observability probability for a node is the probability that a value at that node propagates to the observation point. Stated differently, the observability probability represents the probability that an error at the node becomes observable. In some embodiments, the observability probability may be based on a functional mode setup of the circuit. In certain embodiments, determining the observability probability for a node takes into account the control probabilities and logic types encountered on the path to that node.

In 510, the system determines a set of gates in the cone of influence with an output node with a non-zero observability probability. If a permanent error (e.g., short circuit, broken circuit, or physical breakdown) occurs at the gate, a non-zero observability probability at its output indicates that the permanent error will propagate to the observation point and become observable. In 512, the system multiplies an area of logic elements (e.g., each flop) in the cone of influence with an observability probability of an output node of the logic elements to produce weighted soft error probabilities. The areas may correspond to the number of transistors and/or electrical components in the logic elements. Soft error probabilities represent the probabilities that soft errors at these logic elements propagate to the observation point and become observable. Soft errors are transient errors (e.g., an unexplained bit flip) that can disappear over time. If a soft error does not disappear in time, however, it may propagate to other parts of the circuits, such as the observation point, and cause errors or failures.

In 514, the system determines a permanent error failure mode distribution based on an area of the set of gates or the number of gates in the set of gates determined in 510. For example, the permanent error failure mode distribution for the cone of influence may be a ratio of the area of the set of gates determined in 510 for that cone of influence to the total area of gates with output nodes with non-zero observability probabilities across all cones of influence for the circuit. For RTL designs, where area information is not available, gate count is used to compute failure mode distribution.

In 516, the system determines a weighted soft error failure more distribution based on a sum of the weighted soft error probabilities of the logic elements (e.g., flops) in the cone of influence. For example, the weighted soft error failure mode distribution for the cone of influence may be a ratio of the sum of these weighted soft error probabilities of the logic elements in the cone of influence to the sum of the weighted soft error probabilities of the logic elements (e.g., all flops) in every cone of influence of the circuit.

Figure 6:
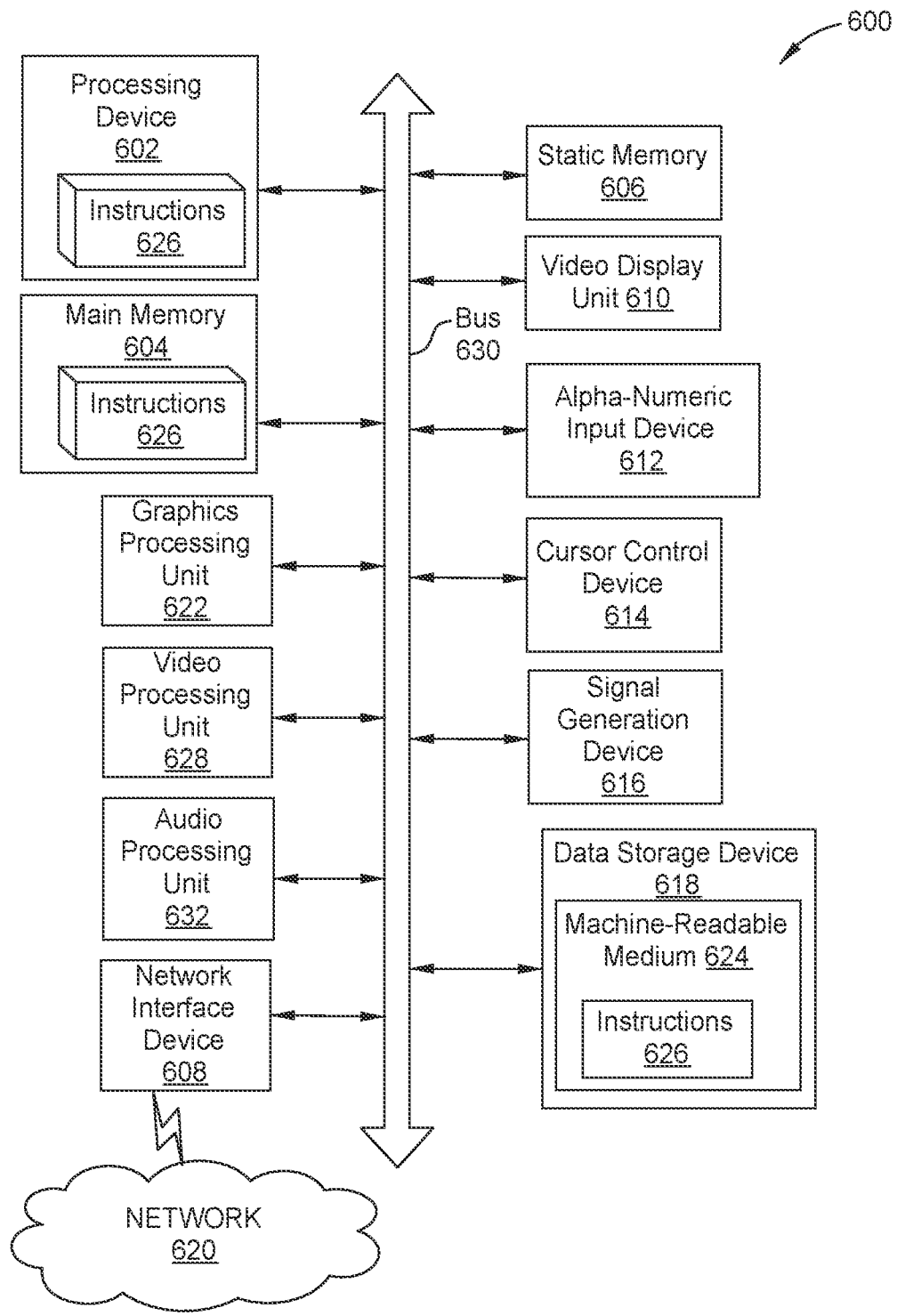
FIG. 6 depicts a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. The system described herein may be embodied in or implemented by the machine in computer system 600. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Figure 7:
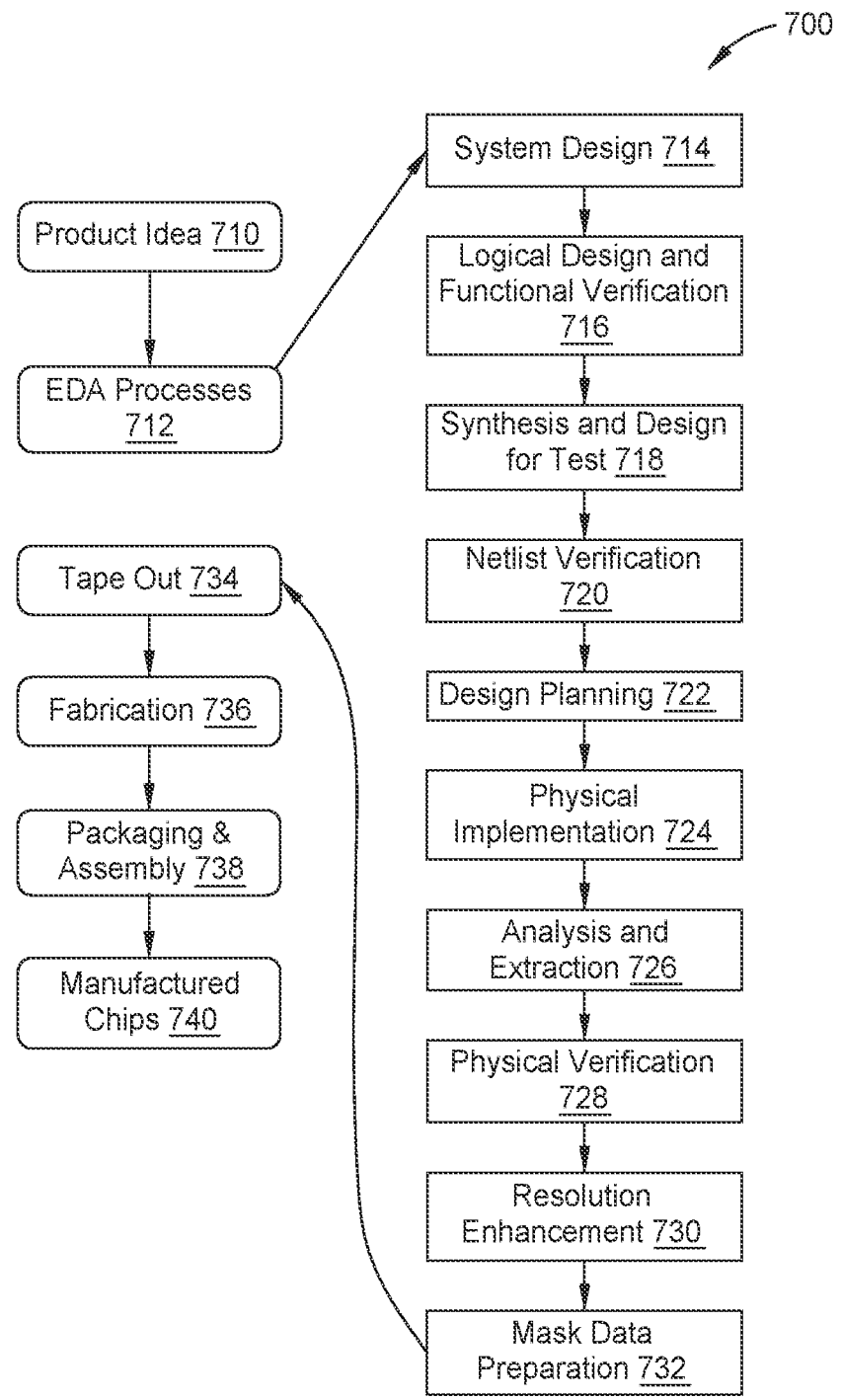
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products.

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification. The disclosed processes for determining permanent error and soft error FMDs may be performed during functional verification 716 (e.g., for RTL designs).

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing. The disclosed process for determining permanent error and soft error FMDs may be performed during netlist verification 720 and/or design planning 722 (e.g., for netlist designs).

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Various features are described with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed subject matter or as a limitation on the scope of the claimed subject matter. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations. Also, various terms are used herein as used in the art, and such terms are intended to encompass the full meaning of those terms as understood by persons having ordinary skill in the art.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for determining a weighed soft error failure mode distribution, the method comprising:
   tracing from an observation point in a circuit to an input of the circuit to produce a cone of influence comprising a plurality of components of the circuit, wherein the plurality of components is connected at a plurality of nodes in the cone of influence, and wherein the plurality of components comprises a plurality of logic elements;
   for each node of the plurality of nodes, determining, based on a functional mode setup of the circuit, an observability probability that a logical high or low value at a corresponding node propagates to the observation point;

determining a weighted soft error probability for each logic element of the plurality of logic elements based on an area of a corresponding logic element and the observability probability of an output node of the corresponding logic element; and determining a weighed soft error failure mode distribution for the cone of influence based on a sum of the weighted soft error probabilities for each logic element of the plurality of logic elements.

2. The method of claim 1, further comprising determining, for each node of the plurality of nodes, a second observability probability that an error at a corresponding node propagates to a safety mechanism that handles the error.

3. The method of claim 1, wherein the soft error failure mode distribution is a ratio of the sum of the weighted soft error probabilities for each logic element of the plurality of logic elements to a sum of the weighted soft error probabilities for each logic element across a plurality of cones of influence.

4. The method of claim 1, further comprising generating a list of fault locations comprising nodes of the plurality of nodes that have a non-zero observability probability per failure mode.

5. The method of claim 1, wherein determining the observability probability for a node is based on a control probability and logic type encountered on a path to that node.

6. The method of claim 1, further comprising determining an automotive safety integrity level based on the soft error failure mode distribution.

7. The method of claim 1, wherein the observation point is specified in a received design file for the circuit.

8. An apparatus for determining a weighed soft error failure mode distribution, the apparatus comprising:
   a memory; and
   a hardware processor communicatively coupled to the memory, the hardware processor configured to:
      trace from an observation point in a circuit to an input of the circuit to produce a cone of influence comprising a plurality of components of the circuit, wherein the plurality of components is connected at a plurality of nodes in the cone of influence, and wherein the plurality of components comprises a plurality of logic elements;
      for each node of the plurality of nodes, determine, based on a functional mode setup of the circuit, an observability probability that a logical high or low value at a corresponding node propagates to the observation point;
      determine a weighted soft error probability for each logic element of the plurality of logic elements based on an area of a corresponding logic element and the observability probability of an output node of the corresponding logic element; and
      determine a weighed soft error failure mode distribution for the cone of influence based on a sum of the weighted soft error probabilities for each logic element of the plurality of logic elements.

9. The apparatus of claim 8, the hardware processor further configured to determine, for each node of the plurality of nodes, a second observability probability that an error at a corresponding node propagates to a safety mechanism that handles the error.

10. The apparatus of claim 8, wherein the soft error failure mode distribution is a ratio of the sum of the weighted soft error probabilities for each logic element of the plurality of logic elements to a sum of the weighted soft error probabilities for each logic element across a plurality of cones of influence.

11. The apparatus of claim 8, the hardware processor further configured to generate a list of fault locations comprising nodes of the plurality of nodes that have a non-zero observability probability per failure mode.

12. The apparatus of claim 8, wherein determining the observability probability for a node is based on a control probability and logic type encountered on a path to that node.

13. The apparatus of claim 8, the hardware processor further configured to determine an automotive safety integrity level based on the soft error failure mode distribution.

14. The apparatus of claim 8, wherein the observation point is specified in a received design file for the circuit.

15. A method for determining a permanent error failure mode distribution, the method comprising:
   tracing from an observation point in a circuit to an input of the circuit to produce a cone of influence comprising a plurality of components of the circuit, wherein the plurality of components is connected at a plurality of nodes in the cone of influence, and wherein the plurality of components comprises a plurality of gates;
   for each node of the plurality of nodes, determining, based on a functional mode setup of the circuit, an observability probability that a logical high or low value at that node propagates to the observation point;
   determining a set of gates of the plurality of gates that have an output node of the plurality of nodes with a non-zero observability probability based on one or more of the observability probabilities of the plurality of nodes; and
   determining a permanent error failure mode distribution for the cone of influence based on an area of the set of gates or a number of gates in the set of gates.

16. The method of claim 15, further comprising determining, for each node of the plurality of nodes, a second observability probability that an error at that node propagates to a safety mechanism that handles the error.

17. The method of claim 15, wherein the permanent error failure mode distribution is a ratio of the area of the set of gates to a total area of gates that have an output node with a non-zero observability probability across a plurality of cones of influence per failure mode.

18. The method of claim 15, further comprising generating a list of fault locations comprising nodes of the plurality of nodes that have a non-zero observability probability.

19. The method of claim 15, wherein determining the observability probability for a node is based on a control probability and logic type encountered on a path to that node.

20. The method of claim 15, further comprising determining an automotive safety integrity level based on the permanent error failure mode distribution.

* * * * *